Oct. 22, 1946.　　　C. E. SOWLE　　　2,409,808
GLAZING UNIT
Filed Feb. 19, 1942
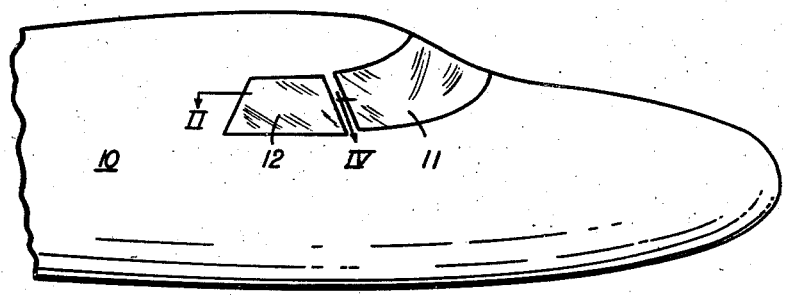
FIG—I
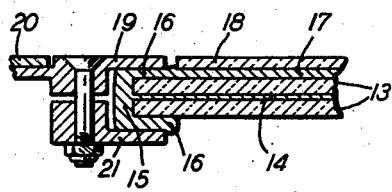　　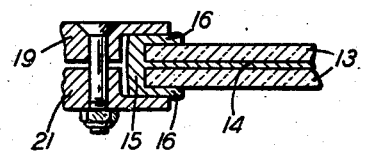
FIG—II　　　　　FIG—III
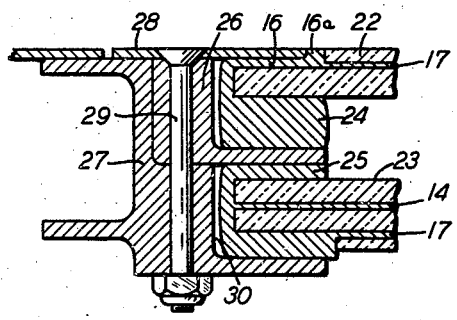　　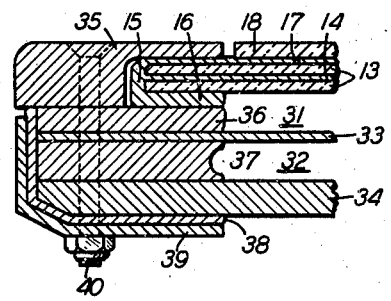
FIG—IV　　　　　FIG—V
INVENTOR
CHARLES E. SOWLE
BY George C. Sullivan

Patented Oct. 22, 1946

2,409,808

UNITED STATES PATENT OFFICE 2,409,808

GLAZING UNIT

Charles E. Sowle, Van Nuys, Calif., assignor to Lockheed Aircraft Corporation, Burbank, Calif.

Application February 19, 1942, Serial No. 431,491

8 Claims. (Cl. 189—64)

This invention relates to improved transparent glazing unit in the form of laminated safety glass, and to the provision of integral mounting and sealing means therefor adapting the same for use in windshield and/or window or door installations subject to mechanical vibration, shocks, torsional stresses, temperature, differentials, etc., said glazing unit being particularly useful in installations where it is desired to maintain a water- and air-tight or leak-proof seal between the laminated windshield or window material and the opening or mounting frame which receives the same.

One method now commonly used for installing safety glass in airplanes comprises placing a rubber or other resident channel about the edges of the glass, which channel is thereafter forced into or clamped in a receiving channel provided therefor in the windshild or window structure or frame. In the severe service to which airplanes are subjected, a combination of causes including aging of the rubber, extreme temperature changes causing unequal expansion and contraction of the glass relative to its frame, vibration, torsional stresses, weaving action, wind and air pressure against the glass, etc., apparently prevents permanent sealing contact between the glass and rubber and the structures in which they are mounted.

Safety glass, as heretofore commercially used, has usually included two or more plies of relatively thin plate glass bonded together by interlayers or thin sheets of transparent plastic material of substantially the same area as the glass.

A comparatively new organic plastic now used as an interlayer in safety glass is a vinyl acetal, more specifically known as polymerized vinyl butyral. This same plastic, as will appear more fully hereinafter, is preferably employed in the transparent closure means disclosed herein, but in a new and novel manner such as to afford advantages and new results not heretofore obtainable with any known materials or closure construction.

The present invention resulted from a conception of a laminated safety glass having a plastic interlayer of such rubber-like characteristics that the interlayer could be extended back in overlapping relationship to the marginal portions of the glass and bonded thereto to replace the usual rubber channel as a gasket or leak-proof sealing means and at the same time serve as a resilient supporting means for the glass itself so that the glass could be supported by its edges from its mounting frame without requiring excessive clamping pressure to be applied to the glass. Polyvinyl butyral was found to be one material practically suitable for embodying the foregoing conception.

In practicing the present invention the polyvinyl butyral plastic provides a bond that is sufficiently soft, pliable, flexible, resilient, deformable, and "flowable" or compressible, to serve as an integral "gasket" for sealing or clamping the laminated glass in an opening or mounting frame. This material, nevertheless, also has adequate mechanical strength to withstand high unit pressures without failure. This is important because in high altitude flying failure of the closure may result in the pilot and passengers getting the "bends."

One of the important objects of this invention relates to providing a safety glass unit having an integral elastic sealing arrangement projecting around or embracing the edges of the glass and of sufficient thickness so that it can serve the dual purpose of supporting as well as sealing the glass.

The invention more particularly relates to a laminated closure comprising at least two sheets of glass or other hard transparent material having an intervening layer of relatively soft, resilient, tough, displaceable, highly compressible, yieldable, somewhat stretchable, water-proof, etc., plastic material therebetween, the plastic material extending back over the exposed marginal edges of one or both of the outer sheets of relatively hard material, and preferably bonded to the surface thereof, being adapted to be secured or clamped in a frame or other mounting means to provide a leak-proof seal between the plastic material and the frame or mounting means.

The principal object of the invention is to provide an improved sheet of transparent laminated material for use as windshields, etc., which includes as an integral part thereof gasket-like means adapted to yield under compressive force to form a water- and air-tight seal embracing and bonded to the marginal edges thereof.

A further object of the invention is to provide an improved safety glass unit arranged so that it can be mounted in the usual manner while distributing any clamping pressure over the margins of the layers of glass comprising said laminated unit.

Still another object of the invention is to provide an improved laminated sheet of safety glass having an interlayer of flexible, deformable, rubber-like material extended to embrace the marginal edges of the glass and which projecting interlayer can be readily formed to shape and/or bonded to the glass margins during the process of bonding the glass laminations together.

A further object of the invention is to provide a laminated windshield or window construction that can be mounted in a frame or window opening in water- and air-tight relation without necessarily requiring the use of extraneous sealing materials such as rubber gaskets, packing, etc.

Another object of the invention is to provide a laminated safety glass unit that can be mounted with a minimum of time and expense.

Another object of the invention is to provide an improved windshield or transparent closure mounting that can be effectively and permanently rendered air- and water-tight, and yet which can be readily and quickly dismounted and replaced without damage to or impairment of the effectiveness of the sealing means.

A further object of the invention is to provide an improved safety glass mounting wherein the outer surface of the glass can be positioned substantially flush with the surrounding surface to reduce air friction and eddy currents.

A still further object of the invention is to provide an improved safety glass having a resilient and plastic transparent interlayer of tye type described that will yield under impact and so help resist penetration of the glass by objects striking the same.

Other and further objects of the invention will be apparent from the following description taken in connection with the accompanying drawing in which:

Fig. I is a diagrammatic fragmentary side elevation of an airplane fuselage showing windshield and window locations to identify the subsequent detail sections.

Fig. II is an enlarged fragmentary sectional view taken on the line II—II to show a type of glass structure and flush mount therefor that is suitable for use in side windows of an airplane fuselage.

Fig. III is an enlarged fragmentary sectional view similar to Fig. II wherein a flush type mounting is not required.

Fig. IV is an enlarged fragmentary sectional view taken on the IV—IV of Fig. I showing a double glazed type of glass mounting suitable for windshield use.

Fig. V is an enlarged fragmentary sectional view similar to Fig. IV but embodying a triple glazed type of windshield construction wherein the inner panes may be glass substitutes.

The several embodiments of the invention chosen for illustrative purposes refer to the use of safety glass sealed in various openings in an airplane body or fuselage 10, for example, the windshield 11 and side windows 12. Normally the openings for the windshield and windows will be defined by structural members of the fuselage, such as ribs and longerons, but for the purposes of this invention the closure clamping frames or mountings will be described without regard thereto.

While the term "glass" is used as a generic term in the description to include semi-tempered glass and transparent plastic, it will be understood that this is for convenience only and that other types of glass, or glass substitutes including various hard transparent resins such as acrylate plastics may be used in practicing the invention in lieu of said glass. It will also be understood that the term "compressible" employed to define one of the characteristics of the plastic interlayer is used herein in the sense that the plastic interlayer is deformable or "flowable" under clamping pressure; there being no material change in total volume. In fact, upon release of the compressive force the plastic tends to return to its original shape and dimensions. Upon the application of local compressive pressure, the thickness of the plastic can be readily reduced to absorb and distribute the pressure, but ordinarily excessive compression pressure is unnecessary to provide the desired seal because of a slight surface tackyness of the preferred plastic.

In each of the forms of the invention chosen for illustrative purposes, the outer glazing panel is shown as a laminated construction wherein one or more layers of synthetic organic plastic or resin are bonded between adjacent layers of glass or glass substitutes. Such sandwiches are commonly referred to as safety glass, since the plastic interlayer prevents dispersal of fragments of shattered glass which are held in position by the bond to the plastic.

For an airplane side window, or other streamlined mounting, a flush window as shown in Fig. II is preferable to the recessed window of Fig. III. The latter form is entirely suitable for automobile and fixed installations such as refrigerated or other display cases. The major parts of these figures are identical, comprising a pair of panels 13 of a hard transparent material of substantially equal surface area bonded to an intervening central lamination 14 of a transparent organic plastic or resin which is tough, flexible, and waterproof. In conditions involving wide ranges of temperature variations I prefer to use a polymerized vinyl butyral resin, which is not so sensitive to temperature variations as other synthetic resins available and usable for less exacting conditions; the preferred resin also having an elastic or rubber-like and compressible characteristic that especially suits it to use as a gasket-like material, as will be discussed hereinafter.

In both Figs. II and III the laminating material 14 is built up around the edges of one or more of the glass panes 13, indicated as at 15, to form a marginal U-shaped channel or gasket extending back and overlying the outer marginal surfaces of the panes as at 16, being bonded along the contacting surfaces in the process of manufacture so that the channel or gasket becomes an integral part of the laminating material 14 as well as firmly bonded to the contacting glass surfaces and edges. In this manner, a laminated closure is provided with "built-in" or adhering gasket sealing means. In Fig. II the outer reentrant margin 16 of the laminating material is extended over the entire outer surface of the glass 13 as indicated at 17, to a bond a third glass pane 18 to the previously described dual sandwich, the glass pane 18 being cut back to clear the mounting frame and arranged to be flush therewith. The thickness of the laminating material 17 need not be the same as the marginal portion 16, although so shown for convenience, as a thicker outer glass layer 18 could be used with a thinner layer of laminating material 17 while still bringing the outer surface flush with the mounting frame, as shown in the outer closure of Fig. IV, for example.

While I have shown and described the complete U shaped channel or gasket 15 and 16 bonded to the edges and margins of the glass sandwich, it is to be understood that the edge or bottom portion 15 of the U may be wholly or partially omitted, the marginal or reentrant layers 16 serving as the gasket-like surfaces in contact with a separable mounting frame. It will be noted in the illustrative embodiments of the invention that the portions 15 of the channels serve primarily as an edge cushion and seal for the glass laminations and therefore can be omitted to simplify the mounting, unless the complete glass unit is to be forced edgewise into a mounting channel, as is customary in movable windows of automobiles.

As shown in Figs. II and III such a mounting frame may comprise a post or outer member 19, to which the skin 20 of the fuselage is secured, the post being rabbeted to receive or overlie the marginal plastic channel 16. An inner frame 21 is similarly rabbeted to embrace the inner surface of the channel 16 and is drawn towards the outer post 19 by a series of bolts or the like which slightly compress the channel sides 16. Such compression of the plastic channel causes a slight displacement of the material at the exposed edges thereof, and provides against excessive localized clamping pressures which might otherwise impose excessive and unpredictable strains in the glass sandwich.

With the foregoing arrangement it will be evident that the outer surface of the glass plate 18 is flush with the outer surface of the frame 19, and that the edges of the glass plate 18 are spaced from the frame element to avoid transmission of mechanical vibrations to the glass. This space may be filled with premolded plastic 16a as shown in Fig. IV if so desired, as it is simple to provide such a shoulder on the plastic edge during the molding process.

In both Figs. II and III the channel-like plastic gaskets 15, 16 are provided to insulate the glass from mechanical vibrations or distortions of the fuselage structure. The mounting arrangements of these figures also help to resiliently support the safety glass against outward or inward displacement if it is subjected to differential pressures, as would be the case in sealed and supercharged cabins intended for high altitude work.

With such a mounting, the laminated glass can be quite firmly mounted without danger of localized strains, as the plastic channel 15, 16 takes care of inequalities in the mounting to assure efficient action as a pliant and deformable gasket. Further, the use of these integral channels aids in compensating for weaving or working of the supporting structure, thus avoiding the transmission of unknown forces to the glass laminations, while maintaining an air- and fluid-tight seal.

If desired, the plastic channel edges 16, on either side of the closure, may be built up to a thickness greater than that part of the plastic laminations 14 or 17 between the glass panes, as in Figs. IV and V, in which case it is desirable to bond the plastic to the adjacent edge and opposite side of one or both of the glass panes. Such thickened margins are simple to produce, as a series of layers of the plastic can be bonded into an integral whole, without evidence of cleavage planes.

Figure IV illustrates an application of my invention to a windshield or transparent cockpit enclosure structure comprising spaced inner and outer laminated panels 22 and 23 defining a dead air space therebetween. The desired spacing is conveniently provided by building up thick plastic channel margins 24 and 25 between the inner surfaces of the panels and the mounting unit therefor, effectively sealing the dead air space between the panels. The outer panel 22 is supported in a subframe or spacer 26 which is retained in a post 27 by an outer frame member or cover 28 and bolts 29, the subframe 26 in turn holding the inner panel 23 in place in a seat or rebate 30 in the post 27. Thus, the inner panel 23 is resiliently supported by the plastic cushion 25 against internal pressure acting thereon; and the inner plastic margin 24 of the outer panel is compressed slightly by bolting the post members in assembled position as shown in Fig. IV. It will be noted that the outer panel 22 is not affected by cabin pressure, which might reach a differential pressure of ten (10) pounds per square inch in a supercharged cabin plane at extreme altitude; while the inner panel 23 is relieved of shock or impact loads resulting from striking a bird in flight, or gravel thrown up by the landing gear.

Fig. V illustrates a triple glazed unit providing two dead air spaces 31 and 32 preferably using glass substitutes such as acrylic resins for the central division 33 and the inner sheet 34. The outer triple layer laminated closure is identical in construction to the showing of Fig. II, with the exception of the thickness of the glass and plastic layers, so that the same reference numerals have been applied. A rabbeted outer frame 35 receives the outer laminated closure, and hard plastic spacers 36 and 37 provide the desired dead air spaces, being sealed by a gasket-like layer 38 of the softer laminating material clamped under an inner frame 39, the latter being held in place by bolts 40. With this arrangement the inner sheet 34 may be adequately supported to carry the internal pressure resulting from cabin supercharging, while the outer laminated closure is cushioned against and supported by the spacer 36 to carry external or impact pressures.

The synthetic resin plastic employed for both laminating or bonding the glass layers, and forming an integral channel-like enveloping edge to serve as a gasket, is an organic plastic, preferably a polymerized vinyl butyral resin. Such material is translucent before bonding between the glass layers and becomes of water-white transparency after bonding.

The preferred plastic per se, supra, forms no part of the present invention and is commercially available under the general trade name of "Vinal," derived from vinyl butyral.

Vinyl butyral itself, it is understood, may be made by treating a mixture of vinyl acetate and vinyl alcohol with butyraldehyde, and plasticizing the resulting resin by the admixture of triethylene-glycol dihexoate. It is further understood, that an example of suitable proportions to produce the desired combination of mechanical strength, flexibility, resiliency, compressibility or flowability comprises a mixture of approximately 20% vinyl acetate and 80% vinyl alcohol treated with butyraldehyde, the resulting resin having about 30% of the total of triethylene glycol added to plasticize the mass. The plasticized mass is then calendered or otherwise treated to reduce the same to suitable sheet form.

In one procedure for fabricating a laminated closure unit of the type described, a plurality of glass plates are assembled with interposed sheets of organic plastic material of larger dimensions. The exposed marginal extensions are built up to the desired size by adding strips of the material about the margins of the glass and are masked by non-adhesive sheet material, such as Cellophane, or other inert masking material. The assembly is placed in a rubber bag from which air is evacuated. The several elements in the bag are then placed in an autoclave and therein subjected to heat of approximately 220 degrees F., under fluid pressure of approximately 150 pounds per square inch. The several elements of the laminated unit are thus bonded into a composite unit. The closure unit can also be fabricated by placing molding frames around the assembled glass sheets and plastic interlayers wherein the interlayer extensions are masked and then the assembly is subjected to sufficient heat and pressure at values indicated above to effect proper bonding. At the same time the frames provide for maintaining proper shape of the marginal extensions at a desired thickness.

When ordinary laminated or solid glass is mounted in the usual way, various forces must be exerted on the glass itself to hold and seal it in the frame. Other forces result from thermal expansion of the glass and frame, and twisting, distortion or weaving movement of the frame relative to the glass caused by stresses in the airplane fuselage. These forces are unpredictable but sometimes are large enough to break or crack the glass before any design load is applied thereto. With the present invention the pliable edge mounting absorbs and distributes such forces and therefore does not transfer sudden movements to the glass so that the latter can be designed for known loads.

Glass is usually considered to fail in tension, and accepted values for both the modulus of rupture and the tensile strength are 6500 pounds per square inch for annealed plate glass and 20,000 pounds per square inch for semi-tempered plate glass.

In the use of the invention the laminated transparent closure may have its edges formed as illustrated in Figs. II, III or IV, in either case the channel-like bonding or plastic material forms a tough, pliable, resilient, flexible, tenacious and rubber-like deformable gasket embracing the glass margins and having sufficient deformability to safely support the transparent closure or panel, the resilience and recoverability of the preferred type of plastic allowing the entire panel to distribute the load thereon over its frame and to adjust its initial position to inequalities of the frame. In this form of the invention the channel plastic is preferably tougher than in ordinary laminated safety glass. Moreover, the clamping stresses are uniformly distributed and confined to the plastic margins 16 and thus do not detract from the ultimate strength of the glass proper.

In all forms of the invention the gasket-like integral margin can yield locally under clamping pressure to assure a water-proof and air-tight seal, and to compensate for any irregularities in the clamping means, as well as to absorb the severe stresses, shocks, strains, and twists to which airplane structures are subjected in use without causing breakage of the glass. The gasket-like margin is also capable of sealing openings in a supercharged cabin without requiring excessive clamping pressures to be imposed upon said margin or on the glass itself.

It will be understood that the concepts and principles of the invention disclosed herein are equally useful in many fields besides aviation; for example, the transparent closure can be used for gas mask lenses, guards over grinding wheels, instrument panels, in display cases, refrigerators, pressure and vacuum chambers, port holes, automobiles, etc.

While laminated glass has been shown and described as particularly adapted to the practice of the invention, it is to be understood that glazing units broadly refer to transparent panels including material other than glass. For example, hard resins can be employed for the opposite surfaces of the unit, while marginal portions are maintained sufficiently flexible and resilient to be susceptible to edge clamping and sealing in the manner described with reference to the extensions 16. It is also possible to use the type of interlayer described in connection with transparent hard resins substituted for the sheets of glass.

It will be understood that the particular plastic disclosed herein may be replaced by other materials having the same desirable characteristics as set forth and that structural changes may be made in the mounting means shown herein without departing from the spirit of the invention or the scope of the appended claims.

I claim:
1. A sheet of laminated safety glass comprising two layers of glass bonded to an interlayer of transparent polymerized vinyl butyral resin, said interlayer extending around the margins of the glass layers to provide a flexible channel-like sealing gasket, the extending portions of said interlayer being thicker than the interlayer and overlying only the marginal portions of said glass layers.

2. A transparent laminated sheet comprising two layers of hard transparent material bonded to a relatively soft, resilient, flexible interlayer of transparent polymerized vinyl butyral resin, said interlayer extending around and bonded to the margins of the layers of hard material to provide a flexible channel-like sealing gasket overlying only the marginal portions of the margins of the hard material the extended portion of said interlayer on at least one side of the hard material being substantially thicker than the portions thereof between said layers of hard material.

3. A laminated transparent closure comprising a plurality of panes of transparent material, an intervening layer of vinyl resin characterized by its transparency, toughness, flexibility, elasticity and water-proofness bonded between said panes and being of greater area than said panes and having edges projecting around and embracing only the marginal edges of said panes, said projecting edges forming a channel-like gasket and being compressible to such an extent as to form a water-tight seal when clamped in a mounting frame, and a mounting frame having clamping means for compressing and sealingly gripping said projecting edges of said intervening layer and the transparent material therebetween.

4. A laminated transparent closure comprising a plurality of panes of transparent material, and at least one intervening layer of transparent plastic material bonded between adjacent panes and extending outwardly beyond the edges thereof and overlying the closure at the margins only thereof to form an integral enveloping plastic channel for the edges of said closure, said extended portions of said plastic being tenacious, resilient, and sufficiently deformable under clamping pressure to serve as a leak-proof gasket; and mounting means for said closure comprising a rabbeted member engaging the overlying plastic channel on one side of the closure, a second rabbeted member engaging the opposite side of said plastic channel, and means securing said rabbeted members together to exert a clamping force upon said overlying portions of said plastic.

5. A laminated transparent closure comprising: two panes of transparent material of substantially the same surface area; and a layer of plastic material disposed between said transparent panes, said plastic material extending outwardly beyond the marginal edges of said panes and including portions extending around said edges and overlying the outer faces of said panes only adjacent the marginal edges thereof to provide a generally U-shaped channel portion completely surrounding the edges of said panes, at least the legs of said U-shaped channel having a greater thickness than the portion of the plastic material disposed between said panes, all portions of said plastic material being and the legs themselves being of substantially uniform thickness and having a width sufficient to serve as a mounting gasket bonded to said panes, and said legs of said U-shaped channel portion being sufficiently thick to serve as a leakproof gasket when a clamping force is applied thereto.

6. A laminated transparent closure comprising: a plurality of panes of transparent material of substantially the same surface area; and an intervening layer of transparent plastic material disposed between said panes and bonded thereto and projecting outwardly beyond the edges thereof, said intervening layer of plastic material including portions extending inwardly and overlying only the marginal portions of the outer surfaces of said panes to provide an integral generally U-shaped gasket surrounding the periphery of said closure, the leg portions of said generally U-shaped gasket being flat and of sufficient thickness and width to form a seal for both sides of said laminated closure at the marginal edges thereof when a clamping force is applied thereto.

7. A laminated transparent closure comprising: two panes of transparent material of substantially the same surface area; a layer of transparent plastic material disposed between said panes and bonding the same together; and plastic means bonded to the outer surfaces of said panes adjacent the marginal edges thereof to provide adhering gasket means extending completely around said closure at the margins only of both outer sides thereof, said last-mentioned plastic means being flat and sufficiently thick and wide enough to serve as a leakproof gasket when a clamping force is applied thereto.

8. A laminated transparent closure comprising: a plurality of panes of transparent material of substantially the same surface area; an interlayer of transparent polymerized vinyl butyral resin disposed between said panes and bonded thereto and projecting outwardly beyond the edges thereof, said interlayer including substantially flat portions extending around the edges of said panes and inwardly and overlying only the marginal portions of the outer surfaces of said panes to provide an integral generally U-shaped gasket surrounding the periphery of said closure, the leg portions of said generally U-shaped gasket being of a thickness substantially greater than the thickness of that portion of said interlayer which lies between said panes; and mounting means for said closure comprising a plurality of members, at least one of which has a rebate to receive said U-shaped gasket, and both of said members including portions clampingly engaging the legs of said U-shaped gasket, said legs being tenacious, resilient, and sufficiently deformable under clamping pressure to serve as a leakproof seal.

CHARLES E. SOWLE.